United States Patent [19]

Hamamura et al.

[11] 4,210,726
[45] Jul. 1, 1980

[54] PROCESS FOR PRODUCING POLYURETHANE FOAM USING AS A FOAM STABILIZER AN ORGANOSILICONE OIL AND A HYDROCARBON OIL

[75] Inventors: Tadashi Hamamura, Yokohama; Isao Noda, Tokyo; Tadashi Yoshii, Yokohama; Masao Takase, Yokohama; Terumi Watanabe, Yokohama, all of Japan

[73] Assignee: Union Carbide Corporation, New York, N.Y.

[21] Appl. No.: 932,637

[22] Filed: Aug. 10, 1978

[30] Foreign Application Priority Data

Aug. 12, 1977 [JP] Japan .................................. 52-96157

[51] Int. Cl.² ............................................. C08G 18/14
[52] U.S. Cl. .................................... 521/110; 252/182; 521/131; 521/132
[58] Field of Search ................. 252/182; 521/131, 132, 521/110

[56] References Cited

U.S. PATENT DOCUMENTS

| 2,901,445 | 8/1959 | Harris | 521/110 |
| 3,061,556 | 10/1962 | Gemeinhardt | 521/110 |
| 3,078,239 | 2/1963 | Gmitten | 521/110 |

Primary Examiner—Maurice J. Welsh
Attorney, Agent, or Firm—Richard J. Gallagher

[57] ABSTRACT

A process for producing high resilience polyurethane foam utilizing as a foam stabilizer a combination of an organosilicone oil of average molecular weight 200–2000 composed of the blocks represented by the formula

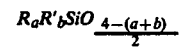

(where $a+b$ is 1 to 3, b is 0 or 1, R is methyl group, and R' is a hydrocarbon group of 3–15 carbon atoms) and a hydrocarbon oil of average molecular weight 200–2000 containing more than 20 wt. % of alicyclic hydrocarbon and/or aromatic hydrocarbon.

12 Claims, No Drawings

PROCESS FOR PRODUCING POLYURETHANE FOAM USING AS A FOAM STABILIZER AN ORGANOSILICONE OIL AND A HYDROCARBON OIL

BACKGROUND OF THE INVENTION

Usually, high resilience polyurethane foam is produced by reacting polyether polyol with an organic isocyanate and water, said polyether polyol having at least two hydroxyl groups per molecule and more than 20% of said hydroxyl groups being primary hydroxyl groups. High resilience polyurethane foam thus produced is called cold cure type polyurethane foam because it needs little or no oven curing which is essential for ordinary heat curing polyurethane foams. Such a foam finds a variety of uses as cushioning materials for automobiles and furniture by virtue of its outstanding resilience, high load bearing properties (SAC factor), and low combustibility.

In the production of heat curing polyurethane foams, the well-known polysiloxane-polyoxyalkylene copolymer has been used as a foam stabilizer. Such a foam stabilizer, however, when added to a foaming composition for high resilience polyurethane foam, causes the resulting foam to shrink, due to its excessive foam stabilizing effect, to such an extent that it is difficult or impossible to obtain open-cell structure by crushing cell membranes. If no foam stabilizer is used at all, the resulting slab stock foam becomes very coarse in cell structure, causing collapse of foam. The absence of foam stabilizer in molded foams also results in coarse cell structure and voids on the molding surface. Thus, it has been a problem in high resilience polyurethane foam to obtain a surfactant which has a proper degree of cell stabilizing ability.

SUMMARY OF THE INVENTION

It has been found that the organosilicone oil composition according to the present invention is extremely effective as a cell stabilizer for high resilience polyurethane foam. It is the essential point of the present invention to use as a cell stabilizer a mixture consisting of an organosilicone oil, a hydrocarbon oil, and optionally a sorbitan fatty acid ester. High resilience polyurethane foam obtained according to the process of the present invention has uniform cell structure and a smooth molding surface. Also, the resulting foam has cell membranes which are easily crushed to give high breathability and outstanding compression fatigue resistance. In addition, the organosilicone oil composition according to the invention is operable over a broad range (e.g. 0.01 to 3 parts by weight based on polyalkylene ether polyol); consequently it is easy to handle.

The organosilicone oil which is one component of the organosilicone oil composition according to the present invention tends to result in irregular cell structure and defective molding surface when used alone, because it is not compatible with polyether polyol which is the major component of a foaming composition. It is the common practice to mix polyether polyol, catalyst, water, and foam stabilizer prior to the foaming process, and an organosilicone oil tends to cause trouble when used alone as a foam stabilizer. However, the mixture of organosilicone oil and hydrocarbon oil provides a superior foam stabilizing effect at all times when mixed with polyether polyol, catalyst, and water prior to the foaming process, because it is compatible with the foaming composition.

The dispersibility of the composition into water is further improved by adding a sorbitan fatty acid ester. Such a compound, when mixed with catalyst-containing water or with polyether polyol, catalyst, and water, provides outstanding foam stabilizing effect.

DESCRIPTION OF THE PREFERRED EMBODIMENTS

The present invention relates to an improvement in the process for producing high resilience polyurethane foam by forming a mixture containing polyalkylene ether polyol having at least two hydroxyl groups per molecule on an average, more than 20% of said hydroxyl groups being primary hydroxyl groups, organic isocyanates, water and/or organic blowing agents, catalysts, and optionally additives, which comprises using as a foam stabilizer an organosilicone oil compound consisting of an organosilicone oil of average molecular weight 200-2000 composed of the blocks represented by the formula

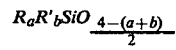

(where a+b is 1 to 3, b is 0 or 1, R is methyl group, and R' is a hydrocarbon group of 3-15 carbon atoms) and a hydrocarbon oil of average molecular weight 200-2000 containing more than 20 weight percent of alicyclic hydrocarbon and/or aromatic hydrocarbon, and optionally a sorbitan fatty acid ester. In the above formula, the group represented by R' and the values of a and b may be the same or different in each block of the organosilicone oil. The hydrocarbon groups as represented by R' are exemplified by propyl, butyl, pentyl, hexyl, heptyl, octyl, nonyl, decyl, undecyl, dodecyl, tridecyl, tetradecyl, pentadecyl, etc. of linear, branched, or cyclic type.

The organosilicone oil used in the invention is produced by the conventional process, in which dimethylhydrosiloxane is reacted in the presence of a platinum catalyst with such alpha olefin as propylene, 1-butene, 1-pentene, 1-heptene, 1-octene, and 1-decene.

The hydrocarbon oil used in the invention includes preferably alicyclic hydrocarbon oil and aromatic hydrocarbon oil, and paraffin oil containing more than 20 weight percent of alicyclic hydrocarbon and/or aromatic hydrocarbon oil. Other hydrocarbon oils do not exhibit good performance as a foam stabilizer because of lack of compatibility with the foaming composition.

The sorbitan fatty acid esters used in the invention are exemplified by polyoxyethylene sorbitan monooleate, polyoxyethylene sorbitan trioleate, polyoxyethylene sorbitan monolaurate, polyoxyethylene sorbitan monostearate, etc.

The preferred polyalkylene ether polyol used in the invention has at least two hydroxyl groups per molecule, more than 20% of said hydroxyl groups being primary hydroxyl group, and has a hydroxyl number of 10-90. This polyalkylene polyol is produced by reacting a starter containing reactive hydrogen atoms with an alkylene oxide such as ethylene oxide, propylene oxide, styrene oxide, or a mixture thereof, and optionally further with ethylene oxide.

The polyoxyalkylene ether polyol can also be a polymer which is obtained by dissolving a vinyl monomer such as acrylonitrile, vinyl chloride, ethylene, and butadiene in polyalkylene ether polyol and grafting the vinyl monomer to the polyol.

The organic isocyanate used in the invention includes isomers of toluene diisocyanate, diphenylmethane diisocyanate, polymethylene polyphenyl isocyanate, etc. They can be used alone or in combination.

The organic blowing agent used in the invention includes monofluorotrichloromethane, methylene chloride, etc.

The foaming composition used in the invention is mixed with such crosslinking agents as 1,4-butane diol, 2,3-butane diol, diethanol amine, neopentyl glycol, and trimethylol propane.

The catalyst used in the invention is an amine or metal catalyst commonly used for the production of polyurethane foams. The amine catalysts include N-methylmorpholine, N-ethylmorpholine, tetramethylhexamethylene diamine, triethylamine, triethylene diamine, coco morpholine, etc. The metal catalysts include dibutyltin dilaurate, stannous octoate, nickel acetylacetonate, etc.

The foam stabilizer of this invention can be added in greatly varying proportions. The optimum quantity depends on the combination of raw materials formed. Usually, the optimum quantity is in the range of from 0.01 to 3 parts by weight based on the polyalkylene ether polyol. If so desired, the foam stabilizer of this invention may be mixed with other kinds of foam stabilizer in order to broaden the latitude for addition quantity.

The following Examples are illustrative of the invention. They are not to be construed as limiting. In the Examples, all "parts" are parts by weight. Materials utilized in the Examples include:

Poly A-1: Polyether polyol produced by addition-polymerizing propylene oxide to glycerol and then addition-polymerizing ethylene oxide. The content of primary hydroxyl group is 75%, and the hydroxyl number is ca. 34 mg/KOH/g.

Polyol A-2: Grafted polymer polyol prepared by polymerizing 20 wt% of acrylonitrile in polyol A-1. The content of primary hydroxyl group is 75%, and the hydroxyl number is ca. 28 mgKOH/g.

Isocyanate B-1: A mixture of 80 parts of toluene diisocyanate 80/20 and 20 parts of crude MDI (crude diphenylmethane diisocyanate). (Isocyanate index 105.)

Isocyanate B-2: Toluene diisocyanate 80/20. (Isocyanate index of 105.)

Foam Stabilizer I: A mixture of 20 parts of organosilicone oil prepared by reacting dimethylhydrosiloxane of molecular weight 700 containing two SiH units on an average in one molecule, with 1-butene, and 80 parts of naphthene hydrocarbon oil (Process oil L-2 made by Esso Standard Oil Co., Ltd.).

Foam Stabilizer II: A mixture of 20 parts of organosilicone oil prepared by reacting dimethylhydrosiloxane of molecular weight 700 containing one SiH unit on an average in one molecule, with 1-hexene, and 80 parts of naphthene hydrocarbon oil (Process oil Necton 37 made by Esso Standard Oil Co., Ltd.).

Foam Stabilizer III: A mixture of 20 parts of organosilicone oil prepared by reacting dimethylhydrosiloxane of molecular weight 500 containing one SiH unit on an average in one molecule, with 1-butene, and 80 parts of naphthene hydrocarbon oil (Process oil Necton 37 made by Esso Standard Oil Co., Ltd.).

Foam Stabilizer IV: A mixture of 15 parts of organosilicone oil prepared by reacting dimethylhydrosiloxane of molecular weight 500 containing one SiH unit on an average in one molecule, with 1-butene, 70 parts of naphthene hydrocarbon oil (Process oil L-2 made by Esso Standard Oil Co., Ltd.), and 15 parts of polyoxyethylene sorbitan trioleate (Tween 85 made by Kao Atlas Co., Ltd.).

EXAMPLE 1

A polyol composition was prepared by mixing together 60 parts Polyol A-1, 40 parts Polyol A-2, 3.0 parts water, 0.1 part triethylene diamine, 0.8 part N-ethylmorpholine, 0.03 part dibutyltin dilaurate, and 0.6 part Foam Stabilizer I. 38.2 parts Isocyanate B-1 were added to the polyol composition. The mixture was agitated vigorously, and then was allowed to foam in a closed aluminum mold. After demolding, the resulting foam was compressed 80% by a crushing roll to break cell membranes. The foam appearance was good, with no shrinkage. The cell count was 24 per 2 centimeters. The foam had a ball drop resilience of 60%.

EXAMPLE 2

A foam was prepared as in Example 1, utilizing in the polyol composition 0.6 part Foam Stabilizer II instead of Foam Stabilizer I. Again, the foam appearance was good, with no shrinkage, and the cell count was 24 per 2 centimeters. The foam had a ball drop resilience of 62%.

EXAMPLE 3

A foam was prepared as in Example 1, utilizing in the polyol composition 0.6 part Foam Stabilizer III instead of Foam Stabilizer I. Again, the foam appearance was good, with no shrinkage, and the cell count was 24 per 2 centimeters. The foam had a ball drop resilience of 61%.

EXAMPLE 4

A foam was prepared as in Example 1, utilizing in the polyol composition 0.6 part Foam Stabilizer IV instead of Foam Stabilizer I. Again the foam appearance was good, with no shrinkage, and the cell count was 24 per 2 centimeters. The foam had a ball drop resilience of 64%.

EXAMPLE 5

A polyol composition was prepared by mixing together 80 parts Polyol A-1, 20 parts Polyol A-2, 3.0 parts water, 0.1 part triethylenediamine, 0.2 part N-ethylmorpholine, 2.0 parts diethanol amine, 0.03 part dibutyltin dilaurate, and 0.3 part Foam Stabilizer I. 41.1 parts Isocyanate B-2 were added to the polyol composition. The mixture was agitated vigorously, and then was allowed to foam in an open box. The foam appearance was good, with no shrinkage. The cell count was 21 per 2 centimeters. The foam density was 23 kilograms per cubic meter. The foam had a ball drop resilience of 60%.

EXAMPLE 6

A foam was prepared as in Example 5, utilizing in the polyol composition 0.3 part Foam Stabilizer II instead of Foam Stabilizer I. Again the foam appearance was good, with no shrinkage, and the cell count was 21 per 2 centimeters. The foam density was 22 kilograms per cubic meter. The foam had a ball drop resilience of 62%.

EXAMPLE 7

A foam was prepared as in Example 5, utilizing in the polyol composition 0.3 part Foam Stabilizer III instead of Foam Stabilizer I. Again the foam appearance was good, with no shrinkage, and the cell count was 21 per 2 centimeters. The foam density was 23 kilograms per cubic meter. The foam had a ball drop resilience of 62%.

EXAMPLE 8

A foam was prepared as in Example 5, utilizing in the polyol composition 0.3 part Foam Stabilizer IV instead of Foam Stabilizer I. Again the foam appearance was good, with no shrinkge, and the cell count was 21 per 2 centimeters. The foam density was 23 kilograms per cubic meter. The foam had a ball drop resilience of 61%.

As controls, the procedures of Examples 1 and 5 were carried out utilizing no foam stabilizer in the polyol compositions. The control foam produced in accordance with the procedure of Example 1 showed voids and partial collapse. The cell count was 12 per 2 centimeters. The foam had a ball drop resilience of 58%. The control foam produced in accordance with the procedure of Example 5 was irregular in appearance and showed coarse cell structure. The cell count was 10 per 2 centimeters. The foam density was 26 kilograms per cubic meter. The foam had a ball drop resilience of 56%.

When one part of Foam Stabilizer I was added to a mixture of 100 parts Polyol A-1 and 3.0 parts water, a clear, uniform solution was obtained. However, when 0.1–0.2 part of the organosilicone oil which is a component of Foam Stabilizer I was added to a mixture of 100 parts Polyol A-1 and 3.0 parts water, the organosilicone oil separated from the polyol/water mixture. This demonstrates the importance to the invention of the combination of the hydrocarbon oil with the organosilicone oil.

Various modifications and variations of this invention will be apparent to workers skilled in the art. It is to be understood that such modifications and variations are to be included within the purview of this application and the spirit of the appended claims.

What is claimed is:

1. In the process for producing high resilience polyurethane foam by foaming a mixture containing polyalkylene ether polyol having at least two hydroxyl groups per molecule on an average, more than 20% of said hydroxyl groups being primary hydroxyl groups, organic isocyanates, water and/or organic blowing agents, catalysts, and optionally additives, the improvement which comprises using as a foam stabilizer an organosilicone oil compound consisting of an organosilicone oil of average molecular weight 200–2000 composed of the blocks represented by the formula

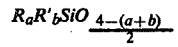

wherein a+b is 1 to 3, b is 0 or 1, R is a methyl group, and R' is a hydrocarbon group of 3–15 carbon atoms, said organosilicone oil containing at least one R' unit on an average in one molecule, and a hydrocarbon oil of average molecular weight 200–2000 containing more than 20 weight percent of alicyclic hydrocarbon and/or aromatic hydrocarbon.

2. In the process for producing high resilience polyurethane foam by foaming a mixture containing polyalkylene ether polyol having at least two hydroxyl groups per molecule on an average, more than 20% of said hydroxyl groups being primary hydroxyl groups, organic isocyanates, water and/or organic blowing agents, catalysts, and optionally additives, the improvement which comprises using as a foam stabilizer an organosilicone oil compound comprising of an organosilicone oil of average molecular weight 200–2000 composed of the blocks represented by the formula

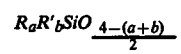

wherein a+b is 1 to 3, b is 0 or 1, R is a methyl group, and R' is a hydrocarbon group of 3–15 carbon atoms, said organosilicone oil containing at least one R' unit on an average in one molecule, a hydrcarbon oil of average molecular weight 200–2000 containing more than 20 weight percent of alicyclic hydrocarbon and/or aromatic hydrocarbon, and a sorbitan fatty acid ester.

3. The process according to claim 1 wherein R' is an alkyl group of 4 to 6 carbon atoms, the organosilicone oil has an average molecular weight of 557 to 814, and the hydrocarbon oil is a naphthene hydrocarbon oil.

4. The process according to claim 2 wherein R' is a butyl group, the organosilicone oil has an average molecular weight of 557, the hydrocarbon oil is a naphthene hydrocarbon oil, and the sorbitan fatty acid ester is a polyoxyethylene sorbitan trioleate.

5. The product of the process of claim 1.
6. The product of the process of claim 2.
7. The product of the process of claim 3.
8. The product of the process of claim 4.
9. A foam stabilizing composition which consists of an organosilicone oil of average molecular weight 200–2000 composed of the blocks represented by the formula

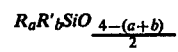

wherein a+b is 1 to 3, b is 0 or 1, R is a methyl group, and R' is a hydrocarbon group of 3–15 carbon atoms, said organosilicone oil containing at least one R' unit on an average in one molecule, and a hydrocarbon oil of average molecular percent of alicyclic hydrocarbon and/or aromatic hydrocarbon.

10. A foam stabilizer composition which consists of an organosilicone oil of average molecular weight 200–2000 composed of the blocks represented by the formula

a+B is 1 to 3, b is 0 or 1, R is a methyl group, and R' is hydrocarbon group of 3–15 carbon atoms, said organosilicone oil containing at least one R' unit on an average in one molecule, a hydrocarbon oil of average molecule weight 200–2000 containing more than 20 weight percent of alicyclic hydrocarbon and/or aromatic hydrocarbon, and a sorbitan fatty acid ester.

11. The foam stabilizing composition according to claim 9 wherein R' is an alkyl group of 4 to 6 carbon atoms, the organosilicone oil has an average molecular weight of 557 to 814, and the hydrocarbon oil is a naphthene hydrocarbon oil.

12. The foam stabilizing composition according to claim 10 wherein R' is a butyl group, the organosilicone oil has a molecular weight of 557, the hydrocarbon oil is a naphthene hydrocarbon oil, and the sorbitan fatty acid ester is a polyoxyethylene sorbitan trioleate.

* * * * *

UNITED STATES PATENT AND TRADEMARK OFFICE
CERTIFICATE OF CORRECTION

PATENT NO. : 4210726
DATED : July 1, 1980
INVENTOR(S) : Tadashi Hamaura, et al.

It is certified that error appears in the above-identified patent and that said Letters Patent are hereby corrected as shown below:

On the title page of the patent, after "[73] Assignee:", for "Union Carbide Corporation, New York, N.Y." please read -- Nippon Unicar Company Limited, Tokyo, Japan --.

Signed and Sealed this

Fourth Day of November 1980

[SEAL]

Attest:

SIDNEY A. DIAMOND

Attesting Officer

Commissioner of Patents and Trademarks